3,310,524
SUBSTITUTED PHENOLS
Ronald James Hurlock, Graham Howard Rayner, and Gerald Scott, all of Manchester, England, assignors to Imperial Chemical Industries Limited, London, England, a corporation of Great Britain
No Drawing. Filed Apr. 23, 1962, Ser. No. 189,271
Claims priority, application Great Britain, Apr. 26, 1961, 15,095/61
2 Claims. (Cl. 260—45.8)

This invention relates to new substituted phenols of value in the stabilisation of natural and synthetic rubbers, rubber articles and latices, polymers and mineral oils.

Natural and synthetic rubbers and polymers are degraded by exposure to ozone with consequent impairment of properties. These polymers and mineral oils are also susceptible to attack by oxygen. We have now found that incorporation into these materials of compounds obtained by condensation of mercaptobenzthiazole, an aldehyde or ketone, and certain phenols affords a high degree of protection against attack by both ozone and oxygen.

Thus according to our invention we provide new substituted phenols which (1) Carry as substituents each located in a 2, 4, or 6 position at least one benzthiazylthioalkyl group of the formula:

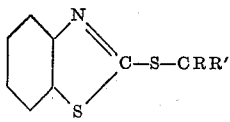

wherein R and R' each stand for hydrogen atom or alkyl group and the nucleus A may carry alkyl, alkylamino, alkoxy or chloro groups as substituents and (2) May carry as substituents one or more lower alkyl, substituted alkyl, cycloalkyl, alkylcycloalkyl or aralkyl groups.

As examples of lower alkyl groups which may be substituents in the substituted phenols there may be mentioned alkyl groups containing not more than 9 carbon atoms such as methyl, ethyl, n-propyl, isopropyl, sec.-butyl, tert.-butyl, tert.-octyl and nonyl.

As examples of cycloalkyl groups there may be mentioned cyclohexyl and cyclopentyl and as examples of alkylcycloalkyl groups there may be mentioned alkylcyclohexyl and alkylcyclopentyl. As examples of substituted alkyl groups there may be mentioned alkylidene groups such as methylene and butylidene joined to another phenol nucleus carrying a benzthiazylthioalkyl group.

As examples of alkyl groups which may be represented by R and R' there may be mentioned methyl, ethyl, propyl and butyl.

As examples of phenols which carry as substituents benzthiazylthioalkyl groups there may be mentioned phenol, o- and p-chlorophenol, 2-tert.-butyl-5-methylphenol, m-cresol, benzylphenol, 2:2′-dihydroxydiphenylmethane, and 1:1-bis(2′-hydroxyphenyl)-butane.

As examples of alkyl groups which may be substituents in the nucleus A there may be mentioned methyl, ethyl and isopropyl. As examples of alkoxy groups there may be mentioned methoxy and ethoxy and as examples of alkylamino groups there may be mentioned methylamino and dimethylamino.

The substituted phenols of our invention include 4-(2-benzthiazylthiomethyl)-2:6-dimethylphenol, 4-(2-benzthiazylthiomethyl)-2:5-dimethylphenol, but preferred as being particularly effective are those compounds in which at least one of the alkyl groups is a tertiary alkyl group, examples of such substituted phenols being 2-(2-benzthiazylthiomethyl)-6-tert.-butyl-4-methylphenol, 4-(2-benzthiazylthiomethyl)-2-tert.-butyl-6-methylphenol, 2:6-bis(2-benzthiazylthiomethyl)-4-tert.-butylphenol, 4-(2-benzthiazylthiomethyl)-2:6-di-tert.-butylphenol or containing an alkylcycloalkyl group, for example 2-(2-benzthiazylthiomethyl)-4-methyl-6-(α-methylcyclohexyl)phenol.

The substituted phenols of our invention may be manufactured by reaction of a mercaptobenzthiazole, an aldehyde or ketone and a phenol in which at least one of the three positions ortho and para to the hydroxyl group is free and which may already be substituted by alkyl, substituted alkyl, cycloalkyl, alkylcycloalkyl or not more than one chloro group. The reaction is preferably carried out in presence of a catalyst such as sulphuric, hydrochloric, or phosphoric acids, boron trifluoride and its complexes, zinc chloride, or organic bases such as hexamethylene tetramine, urea, triethylamine. The reactants methylene tetraamine, urea, triethylamine. The reactants may be mixed and heated alone or may be dissolved in a solvent such as xylene or dioxan and then raised to a temperature between 60 and 120° C. If desired the reaction may be carried out in two stages for example by first interacting the mercaptobenzthiazole with the aldehyde by known methods and then condensing the hydroxymethyl compound so obtained with the phenol or by condensing the mercaptobenzthiazole with an α-hydroxyalkylphenol or α-chloroalkylphenol.

According to a further feature of our invention we provide an improved process for the preservation of natural and synthetic rubbers, rubber articles and latices, polymers and mineral oils which comprises the incorporation therein of a substituted phenol as hereinbefore described.

The substituted phenol may be incorporated into the rubber, rubber articles and latices, polymers or mineral oils according to the usual methods. Thus, for example, when used for preserving rubber it may be mixed with the rubber or rubber latex along with vulcanising and other ingredients such as antioxidants, pigments, fillers, plasticisers and blowing agents, and the resulting mixes then cured by heat treatment, or it may be mixed with rubber along with the other compounding ingredients and the mixture may be vulcanised by treatment with sulphur monochloride in the cold. The antiozonant effect of the substituted phenol in rubbers may be still further enhanced by the incorporation in addition of paraffin or microcrystalline wax.

The substituted phenol is preferably used in proportions of from 0.5% to 5.0% of the weight of rubber or polymer, but larger or smaller proportions may be used if so desired. When used for preserving mineral oils the preferred proportions are from 0.001% to 2.0% of the weight of oil. When used for the preservation of polymers such as polyethlyene or polypropylene, the substituted phenol may be used in conjunction with other antioxidants for example an alkyl thiodipropionate.

The synthetic rubbers which may be used include for example polymers of butadiene-1:3, isobutene, 2-methylbutadiene-1:3, and 2-chlorobutadiene-1:3, and copolymers of these compounds with each other or with acrylonitrile, styrene, methyl methacrylate and other well known polymerisable compounds which are used in the manufacture of these rubbers. The polymers which may be used include for example polythene, polypropylene, polyvinyl chloride and polystyrene. The mineral oils which may be used include for example lubricating oils and motor fuels.

According to our invention we also provide new compositions of natural or synthetic rubbers, polymers or mineral oils characterised in that there is incorporated therein a substituted phenol as hereinbefore described.

The polymer compositions may contain the rubber in any form, for example in massive, dispersed or fabricated form, and may be vulcanised or unvulcanised.

The substituted phenols used in the process of our invention possess extremely good antiozonant and antioxidant properties and in addition are non-staining. In this last property in particular they represent a considerable advance over previously disclosed antiozonants and they are of value in the preservation of rubber articles which are white, pale coloured or brightly coloured, in which cases discolouration on ageing is highly objectionable. They may also be used with advantage in rubbers or other polymeric materials which are in contact with such white, pale coloured or brightly coloured rubber in order to avoid migration of stain to these rubbers.

A further advantage of the substituted phenols of our invention when used as antiozonants in rubbers is that they have a beneficial effect on the vulcanisation in that they not only act as retarders of premature vulcanisation but also lead to vulcanisates of improved physical properties. These effects are however only shown when non-basic accelerators such as mercaptobenzthiazole, mercaptobenzthiazyldisulphide, tetraalkylthiuram sulphides, benzthiazylsulphenamides, and metal dialkyldithiocarbamates, are used. In contrast use of these substituted phenols with basic accelerators, such as diphenylguanidine, di-o-tolylguanidine and aromatic amine/aldehyde condensates affords mixes which are very prone to premature vulcanisation.

The invention is illustrated but not limited by the following examples in which the parts and percentages are by weight:

*Example 1*

8 parts of 37% aqueous formaldehyde are added to a solution of 16.4 parts of 2-tert.-butyl-4-methylphenol, 16.7 parts of mercaptobenzthiazole and 12 parts of 32% aqueous hydrochloric acid in 180 parts of dioxan at 80° C. The reaction mixture is heated at the boil for 2 hours and then cooled. 20.6 parts of 2-(2-benzthiazylthiomethyl)-6-tert.-butyl-4-methylphenol are precipitated and collected by filtration. After crystallisation from petrol ether this compound melts at 167° C. and is found to contain carbon 65.9%; nitrogen 4.2%; sulphur 18.9%. $C_{19}H_{19}ONS_2$ requires carbon 66.4%; hydrogen 6.1%; nitrogen 4.7% and sulphur 18.7%.

*Example 2*

18.4 parts of sulphuric acid are added slowly to a stirred mixture of 64.7 parts of 2-tert.-butyl-4-methyl-6-hydroxy-methylphenol and 55.7 parts of mercaptobenzthiazole at room temperature. When no more heat is evolved the mixture is heated at a temperature between 70 and 80° C. for 1 hour. After cooling the reaction mixture is crystallised from aqueous ethanol to give a product identical with that obtained in Example 1.

*Example 3*

The procedure of Example 1 is repeated using 2-methyl-6-tert.-butylphenol instead of 4-methyl-4-tert.butylphenol, and in this case the reaction mixture is heated at the boil for 5 hours. 11.9 parts of 4-(benzthiazylthiomethyl)-2-tert.butyl-6-methylphenol, melting at a temperature between 158° C. and 159° C., are obtained.

*Example 4*

Rubber mixes of the following compositions are made up:

|  | Mix A | Mix B | Mix C |
|---|---|---|---|
| Pale crepe natural rubber | 100 | 100 | 100 |
| Zinc oxide | 25 | 25 | 25 |
| Titanium dioxide | 50 | 50 | 50 |
| Finely divided chalk | 15 | 15 | 15 |
| Stearic acid | 1 | 1 | 1 |
| Sulphur | 2.5 | 2.5 | 2.5 |
| Mercaptobenzthiazole | 0.6 | 0.6 | 0.6 |
| 4-isopropylaminodiphenylamine |  | 2 |  |
| 2-(2-benzthiazylthiomethyl-6-tert.-butyl-4-methylphenol |  |  | 2 |

These mixes are cured at 153° C. for 17.5 minutes. Test strips of each vulcanised mix are exposed to air containing 0.2 part per million of ozone. The appearance of the strips after exposure is detailed in Tables 1 and 2 and demonstrates that 2-(2-benzthiazylthiomethyl)-6-tert.-butyl-4-methylphenol is only slightly inferior to the commercial antiozonant 4-isopropylaminodiphenylamine, which imparts heavy stains to white rubbers.

TABLE 1.—STATIC

|  | Mix A | Mix B | Mix C |
|---|---|---|---|
| 17 hours | Cracking over whole area. | None | None. |
| 91 hours | Moderately deep cracking over whole area. | Cracks at edges and slight signs of cracking over remaining area. | Cracks at edges, slight signs of cracking over remaining area. |
| 193 hours | Deep cracking over whole area. | Cracks at edges and cracking over remaining area. | Cracks at edges and over remaining area. |

TABLE 2.—DYNAMIC

|  | Mix A | Mix B | Mix C |
|---|---|---|---|
| 5 hours | Sparse cracking over whole area. | Slight signs of cracking over whole area. | Cracks at edges and slight signs of cracking over whole area. |
| 57 hours | Moderately deep cracking over whole area. | Fine cracking over whole area. | Fine cracking over whole area. |
| 104 hours | Deep cracks over whole area. | Cracks at edges and cracking over whole area. | Cracking over whole area. |

Example 5

Rubber mixes of the following compositions are made up:

|  | Mix D | Mix E | Mix F |
|---|---|---|---|
| Pale crepe natural rubber | 100 | 100 | 100 |
| Zinc oxide | 25 | 25 | 25 |
| Titanium dioxide | 50 | 50 | 50 |
| Stearic acid | 1 | 1 | 1 |
| Finely divided chalk | 15 | 15 | 15 |
| Sulphur | 2.5 | 2.5 | 2.5 |
| Mercaptobenzthiazole | 0.5 | 0.5 | 0.5 |
| 2-(2-benzthiazylthiomethyl)-6-tert.-butyl-4-methylphenol |  | 2.0 |  |
| Commercial phenolic antioxidant |  |  | 2.0 |

Samples of mixes D and F are cured at 141° C. for varying lengths of time and then have the following physical properties:

|  | Time (min.) | Mix D | Mix E |
|---|---|---|---|
| Tensile strength (kg./cm.²) | 25 | 122 | 146 |
|  | 30 | 137 | 171 |
|  | 40 | 143 | 164 |
| Elongation at break (percent) | 25 | 720 | 713 |
|  | 30 | 732 | 717 |
|  | 40 | 724 | 684 |
| Modulus at 500% (kg./cm.²) | 25 | 66 | 74 |
|  | 30 | 71 | 94 |
|  | 40 | 74 | 98 |
| Mooney scorch min. at 120° C. (min. +10) |  | 23.5 | 36 |

Strips of vulcanised mixes D and E and of similarly vulcanised mix F are exposed to irradiation from a xenon lamp. After varying times of exposure the light reflecture is measured using a violet filter giving the following results:

|  | Mix D | Mix E | Mix F |
|---|---|---|---|
| Exposure time: |  |  |  |
| 0 days | 86 | 85 | 83 |
| 1 days | 85 | 80 | 83 |
| 2 days | 84 | 75 | 76 |
| 4 days | 75 | 65 | 68 |

Example 6

18.4 parts of sulphuric acid are added dropwise to a stirred solution of 8.4 parts of 2:6-dihydroxymethyl-4-methylphenol and 16.7 parts of mercaptobenzthiazole in 200 parts of dioxan at 56°. When no more heat is evolved, the solution is heated at the boil for 2 hours and then cooled. The product, 2:6-bis-(benzthiazol-2-ylthiomethyl-4-methylphenol), is filtered off, washed with dioxan and then with water. The compound melts between 126 and 129° C. and is found to contain C, 58.5; H, 4.0; N, 5.6; S, 126.1%. $C_{23}H_{18}N_2OS_4$ requires C, 59.2; H, 3.9; N, 6.0; S, 27.5%.

Example 7

Rubber mixes of the following compositions are made up:

|  | Mix G | Mix H | Mix I |
|---|---|---|---|
| Pale crepe natural rubber | 100 | 100 | 100 |
| Zinc oxide | 25 | 25 | 25 |
| Titanium dioxide | 50 | 50 | 50 |
| Finely divided chalk | 15 | 15 | 15 |
| Stearic acid | 1 | 1 | 1 |
| Sulphur | 2.5 | 2.5 | 2.5 |
| Mercaptobenzthiazole | 0.6 | 0.6 | 0.6 |
| 4-isopropylaminodiphenylamine |  | 2 |  |
| 2:6-bis-(2-benzthiazylthiomethyl)-4-methylphenol |  |  | 2 |

These mixes are cured for 18 minutes at 153° C. Test strips of each vulcanised mix are exposed to air containing 0.2 part ozone per million of air. Changes in the appearance of the strips after exposure are detailed in Tables 3 and 4 and demonstrate that 2:6-bis-(2-benzthiazylthiomethyl)-4-methylphenol is an efficient antiozonant and is only slightly inferior to the staining antiozonant 4-isopropylamine diphenylamine.

TABLE 3

|  | Mix G | Mix H | Mix I |
|---|---|---|---|
| 81 hours | Moderately deep cracking over whole area. | Sparse cracking over whole area. | Sparse cracking over whole area. |
| 240 hours | Deep cracking over whole area. | Moderately deep sparse cracking over whole area. | Moderately deep sparse cracking over whole area. |

TABLE 4.—DYNAMIC

|  | Mix G | Mix H | Mix I |
|---|---|---|---|
| 47 hours | Cracking over whole area. | None | None. |
| 117 hours | Deep cracking over whole area. | Moderately deep sparse cracking over whole area. | Moderately deep cracking over whole area. |

Example 8

Rubber mixes of the following compositions are made up and cured for 18 minutes at 153° C.

|  | Mix J | Mix K | Mix L |
|---|---|---|---|
| Pale crepe natural rubber | 100 | 100 | 100 |
| Zinc oxide | 25 | 25 | 25 |
| Titanium dioxide | 50 | 50 | 50 |
| Stearic acid | 1 | 1 | 1 |
| Finely divided chalk | 15 | 15 | 15 |
| Sulphur | 2.5 | 2.5 | 2.5 |
| Mercaptobenzthiazole | 0.6 | 0.6 | 0.6 |
| Commercial phenolic antioxidant |  | 2 |  |
| 2:6-bis-(2-benzthiazylthiomethyl)-4-methyl phenol |  |  | 2 |

Strips of vulcanise mixes J. K and L are exposed to irradiation from a xenon lamp. After varying times of exposure the light reflectance is measured using a violet filter giving the following results:

|  | Mix J | Mix K | Mix L |
|---|---|---|---|
| Exposure time: |  |  |  |
| 0 days | 86 | 85 | 85 |
| 7 days | 84 | 73 | 72 |
| 9 days | 82 | 66 | 66 |
| 12 days | 81 | 66 | 60 |

What we claim is:
1. A substance selected from the group consisting of rubbery homopolymers of diolefins and copolymers of diolefins with ethylenically unsaturated compounds containing a stabilizing amount of a member selected from the group consisting of 2-(2-benzthiazylthiomethyl)-6-tert butyl-4-methyl phenol and 2:6-bis-(2-benzthiazylthiomethyl)-4-methyl phenol.

2. The substance of claim 1 wherein said stabilizing member is present in amounts of 0.5 to 5.0 weight percent based on said substance.

References Cited by the Examiner
UNITED STATES PATENTS

| 2,134,957 | 11/1938 | Sebrell | 260—306 |
| 2,263,273 | 11/1941 | Paulsen | 252—402 |
| 2,273,995 | 2/1942 | Rogerson et al. | 260—800 |
| 2,607,737 | 8/1952 | Woodruff | 260—306 |
| 2,616,871 | 11/1952 | Newly | 260—45.8 |
| 2,666,764 | 1/1954 | Lunzillote et al. | 260—304 |
| 2,763,646 | 9/1956 | Brooker et al. | 260—304 |
| 3,049,509 | 8/1962 | Hardy et al. | 260—45.8 |
| 3,062,779 | 11/1962 | De Hilster | 260—800 |
| 3,215,641 | 11/1965 | Rocklin | 260—800 |

LEON J. BERCOVITZ, *Primary Examiner.*

H. E. TAYLOR, *Assistant Examiner.*